United States Patent [19]

Hamburg

[11] 3,813,708
[45] June 4, 1974

[54] KITCHEN SINK STRAINER AND DRAIN BOWL UNIT
[75] Inventor: Jacob J. Hamburg, Oak Park, Mich.
[73] Assignee: Admiral Marine Products Company, Detroit, Mich.
[22] Filed: Dec. 29, 1972
[21] Appl. No.: 319,888

[52] U.S. Cl............................ 4/286, 4/288, 4/292, 4/295
[51] Int. Cl....... A47k 1/14, E03c 1/26, E03c 1/262
[58] Field of Search....... 4/286, 287, 290, 292, 295; 138/89, 90, 96

[56] References Cited
UNITED STATES PATENTS

| | | | |
|---|---|---|---|
| 2,569,615 | 10/1951 | Link | 4/287 |
| 3,119,123 | 1/1964 | Francalanza | 4/287 |
| 3,314,085 | 4/1967 | Minella | 4/287 |
| 3,525,105 | 8/1970 | Richards | 4/287 |
| 3,711,874 | 1/1973 | Gajer | 4/287 |

Primary Examiner—Harvey C. Hornsby
Assistant Examiner—G. R. Robinson
Attorney, Agent, or Firm—Cullen, Settle, Sloman & Cantor

[57] ABSTRACT

A drain bowl, fastened within the drain opening of a kitchen sink, is provided with a keyhole slot type opening through its bottom, with a wedge shaped cam formed around the opening on the bottom surface of the drain bowl. A bowl-shaped strainer is nested within the drain bowl and has an integral central stem extending downwardly through the hole with a radial projection engaged with the cam beneath the drain bowl bottom to seal the strainer downwardly against the drain bowl interior wall. A coil spring surrounding the stem and engaged between the bottom of the strainer and the interior surface of the bottom of the drain bowl, forces the strainer upwardly for spacing the strainer from the drain bowl, for drainage therebetween, when the strainer is rotated to disengage the projection from the cam.

5 Claims, 7 Drawing Figures

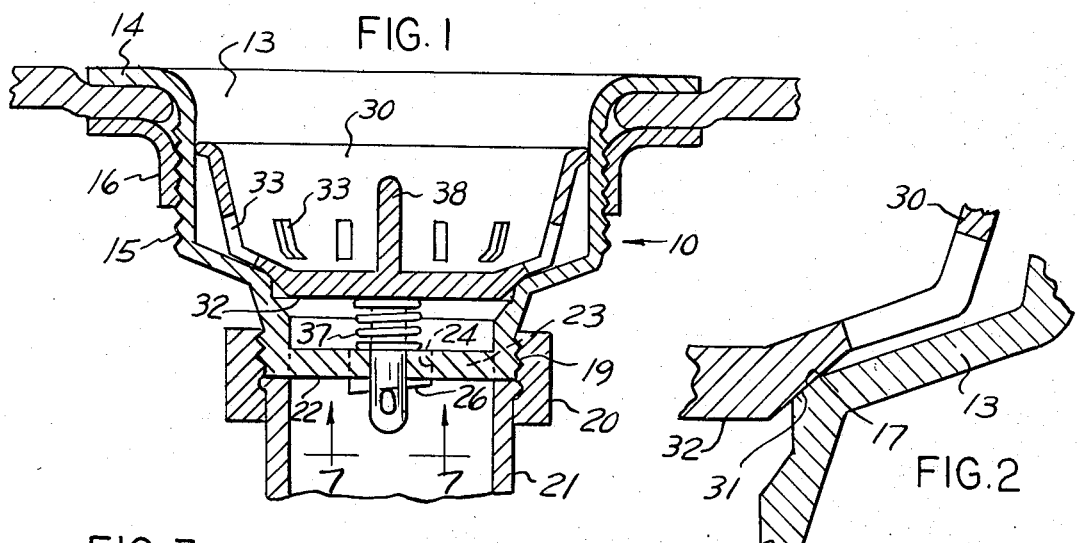
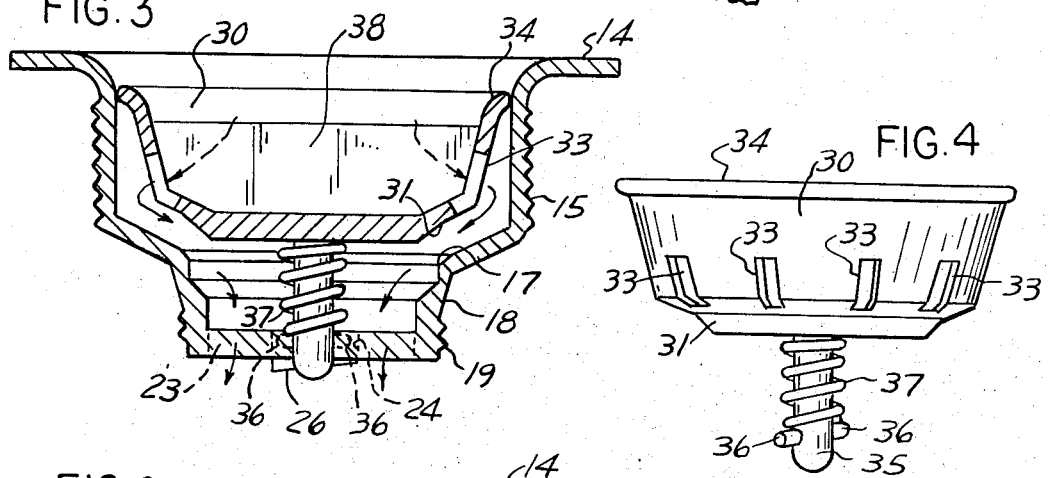
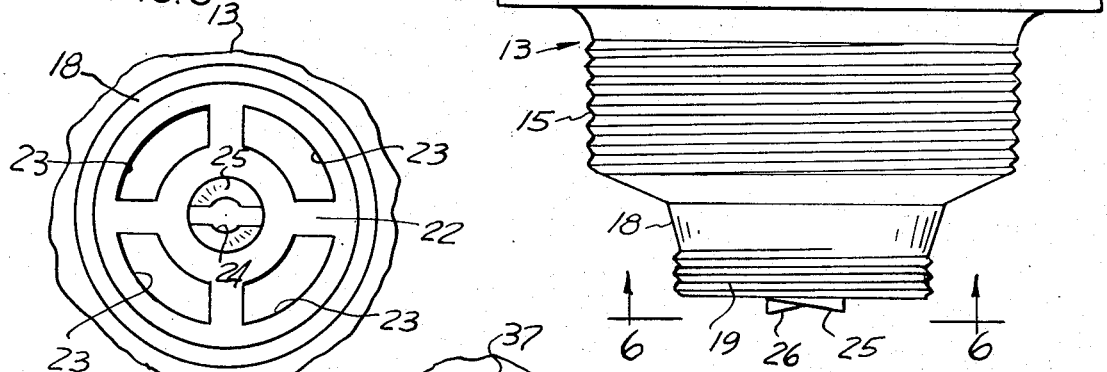
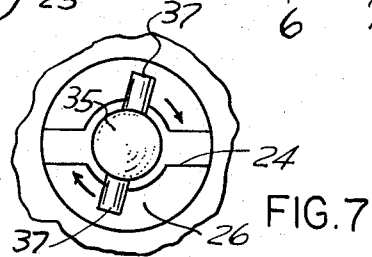

KITCHEN SINK STRAINER AND DRAIN BOWL UNIT

BACKGROUND OF INVENTION

Conventional kitchen sink strainer and drain bowl units include a drain bowl portion which is fastened within the drain opening of a kitchen sink and is connected at its lower end to the drain pipe for carrying liquid draining from the sink. Fitted within the drain bowl is a bowl shaped strainer formed for sealing against the drain bowl to act as a stopper for the sink, or alternatively, for loosening relative to the bowl for drainage and for removal from the bowl for cleaning the strainer.

Typically, the strainer is provided with a depending stem having a flattened lower end which fits through an elongated hole in the bowl so that upon rotation of the strainer, the upper edges of the flattened end portion engage beneath the bowl to lock the strainer against the bowl for sealing. Usually, a rubber or rubber-like gasket is secured to the underside of the strainer for sealing against the bowl when the stem is engaged.

To permit drainage, the strainer, with its stem, is partially rotated to align the flattened end of the stem with the elongation of the hole so that it may be lifted upwardly and the bottom of the flattened end rested cross-wise on the hole area to support the strainer in a spaced relationship relative to the bottom of the bowl.

In this conventional type of construction, it is difficult to obtain a good, tight seal between a strainer and bowl. Additionally, when the strainer is in its up or spaced position, it has a tendency to slip and fall back into the sealed position thus stopping the drainage inadvertently. Moreover, it is relatively difficult to rotate the strainer to engage or disengage it for sealing purposes.

Thus, the invention herein relates to an improvement to sink strainer and drain bowl units including a spring means for positively spacing apart and holding in an up position the strainer relative to the bowl and also including an improved means for locking the strainer to the bowl for sealing.

SUMMARY OF INVENTION

The invention herein contemplates forming a wedge shaped cam surface beneath the central hole of the bowl and forming projections, such as short studs, on the lower end of the strainer stem for tight cam-lock engagement which forces the strainer downwardly against the bowl for positive sealing. The invention also contemplates the provision of a spring means, such as a coil spring, positioned between the bottom of the strainer and the upper surface of the bottom of the bowl for causing the strainer to pop up and remain spaced above the lower end of the bowl for drainage purposes, when the projections are disengaged from the cam.

With this construction, the strainer and the drain bowl may be made of molded plastic material with direct surface to surface sealing, thus eliminating the need for sealing gaskets.

In addition, the construction herein provides a positive raised location for the strainer, preventing inadvertent sealing of the strainer against the bowl, due to the spring pressure which spaces the strainer from the bowl unless positive rotative movement is provided for interengaging the stem projections with the cam.

These and other objects and advantages of this invention will become apparent upon reading the following description, of which the attached drawings form a part.

DESCRIPTION OF DRAWINGS

FIG. 1 is a cross-sectional view of the sink strainer and drain bowl unit shown mounted within a sink and connected to a drain pipe, with the strainer in its sealed position.

FIG. 2 is an enlarged, fragmentary view showing the sealing engagement between the strainer and drain bowl.

FIG. 3 is a view of the strainer and drain bowl, in cross-section, with the strainer in raised or drainage position.

FIG. 4 is an elevational view of the strainer.

FIG. 5 is an elevational view of the drain bowl.

FIG. 6 is a fragmentary, bottom view of the drain bowl, taken in the direction of arrows 6—6 of FIG. 5.

FIG. 7 is an enlarged, fragmentary view, showing the engagement between the stem projections and cams and is taken in the direction of arrows 7—7 of FIG. 1.

DETAILED DESCRIPTION

FIG. 1 illustrates the improved strainer-drain bowl unit 10 mounted within the drain opening 11 of a conventional kitchen sink 12. For illustration purposes, only the drain opening area of the kitchen sink is illustrated.

The drain bowl or sump 13 is provided with an upper flange 14 which overlaps the edge surrounding the drain opening 11. Exterior threads 15 formed on the drain bowl engage with a ring nut 16 which bears against the bottom of the edge of the opening 11 for securing the bowl to the sink.

The bowl is narrowed to form an annular sealing shoulder 17, beneath which is a smaller diameter lower end 18 with exterior threads 19. A conventional threaded coupling 20 (schematically shown) secures a conventional drain pipe 21 to the lower end 18 of the drain bowl.

The bottom 22 of the drain bowl is provided with a number of arcuate drain slots 23 (see FIG. 4). In addition, a central keyhole or bayonet slot type hole 24 is formed in the bottom 22 of the drain bowl. Opposed arcuate wedge-shaped cam surfaces 25 and 26 are formed on the opposite sides of the hole 24.

Preferably, the bowl is formed of a molded plastic material, as is the bowl shaped strainer 30 which is formed to nest within the drain bowl.

The strainer is contoured to form an outer, lower, annular sealing face 31 to engage and seal against the annular sealing shoulder 17 of the drain bowl (see FIG. 2). The strainer has a base 32 of a size to generally fit within the smaller diameter lower end 18 of the drain bowl. Drain slots 33 are formed in the wall and sealing face of the strainer for the passage of liquid, but for the purpose of retaining particles, such as food particles, etc. In addition, the upper edge of the strainer is provided with an edge lip 34 which closely fits within the drain bowl.

A stem 35 is formed integral with the bottom of the base 32 and radially directed studs or projections 36 are formed on the lower end of the strainer. A coil spring 37 is mounted upon the stem between the projections and the base 32.

In order to grasp and to rotate the strainer, a hand grip, such as a transversely arranged plate 38 is formed across the interior of the strainer. The shape and size of the grip may vary.

In operation, the bowl is mounted within the kitchen sink as illustrated in FIG. 1. Then the strainer is dropped into the bowl with its stem arranged so that the projections are aligned with the elongated portions of the keyhole shaped opening 24. In this position, as illustrated in FIG. 3, the strainer is held in a lifted up or raised position so that its annular sealing face is spaced from the annular sealing shoulder of the bowl for passage of liquids through the slots, through the bowl and out through the arcuate slots 23 in the bottom of the bowl and into the drain pipe as shown by the arrows in FIG. 2. In typical kitchen use, food particles and other debris remain within the strainer during liquid drainage.

For stopping or sealing the sink drain opening, the hand grip 38 is manually grasped, the strainer is pushed downwardly, compressing the spring, until the projections or studs 36 clear the bottom of the bowl, at which point the handgrip is twisted to rotate the strainer and the stem. Such rotation causes the studs to be cammed downwardly by the wedge-shaped surfaces 25 and 26, to thus pull the strainer tightly downwardly for tight sealing between the annular sealing face 31 and the annular shoulder 17. In that position, the slots 33 in the strainer are blocked off and the strainer functions as a stopper.

FIG. 6 illustrates the movement of the projections or studs in engaging with the cam surfaces. By proper length of the stem, the sealing between the strainer and bowl is sufficiently tight to prevent water leakage therethrough, thus eliminating the need for gaskets or the like, due to the positive interlock and downward force caused by the cam and stud arrangement.

As soon as the handgrip 38 is counter-rotated for releasing the stopper action, the strainer pops up into its lifted position, where it remains.

Having fully described an operative embodiment of this invention, I now claim:

1. A kitchen sink strainer and drain bowl unit comprising:

a drain bowl formed for fixed securement within the drain opening of a kitchen sink, for connection of said drain opening to a drain pipe, and a bowl shaped strainer loosely nested within the drain bowl;

an elongated hole formed through the center of the bottom of the bowl;

a downwardly extending stem having its upper end secured to the bottom of the strainer and its lower end portion slidably and rotatably fitted through said hole;

a radial projection formed on the lower end portion of the stem and of a size for slidably fitting through a portion of said hole and then against the drain bowl bottom surface edge portion defining the hole, upon rotation of the stem, for thereby sealing the strainer against the interior wall of the drain bowl and for releasing upon counter-rotation;

and a spring means mounted between the strainer and drain bowl for spring lifting and holding the strainer raised relative to the drain bowl, for drainage therebetween, upon release of the stem projection.

2. A construction as defined in claim 1, and said spring means comprising a coil spring encircling the stem between the projection and bottom of the strainer, and the lower end of the spring bearing against the interior surface of the bowl for providing a spring force between the bowl and the strainer for urging them apart.

3. A construction as defined in claim 1, and said hole being of a keyhole slot configuration, and said projection formed as a short, radially outwardly directed member attached to the stem and of a size to pass through the elongated portion of said hole;

and a wedge shaped surface formed upon the bottom of the bowl adjacent said hole, for downwardly camming engagement with said member, for thus pulling the strainer downwardly against the bowl.

4. A construction as defined in claim 3, and said spring means comprising a coil spring encircling the stem and with the opposite ends of the spring respectively abutted against the bottom of the strainer and the interior of the mold bottom for providing a spring force normally urging the strainer upwardly away from the bowl.

5. A construction as defined in claim 1, and said drain bowl interior wall having an annular shaped downwardly and inwardly tapered sealing surface formed therein, and a correspondingly tapered annular edge formed on the bottom of the strainer for face to face sealing contact with the bowl sealing surface for thereby forming the seal between the strainer and drain bowl.

* * * * *